United States Patent [19]

Deike et al.

[11] Patent Number: 4,805,715
[45] Date of Patent: Feb. 21, 1989

[54] DIFFERENTIAL PAWL ACTIVATION APPARATUS

[75] Inventors: Horst Deike, Clauen; Erwin Petersen, Wunstorf, both of Fed. Rep. of Germany

[73] Assignee: WABCO Westinghouse Fahrzeugbremsen GmbH, Hanover, Fed. Rep. of Germany

[21] Appl. No.: 940,704

[22] Filed: Dec. 11, 1986

[30] Foreign Application Priority Data

Dec. 12, 1985 [DE] Fed. Rep. of Germany ....... 3543894

[51] Int. Cl.⁴ .............................................. B60K 23/04
[52] U.S. Cl. .................................... 180/197; 180/233; 180/249
[58] Field of Search .............. 180/197, 248, 249, 250, 180/271, 282, 233; 74/710, 710.5, 711

[56] References Cited

U.S. PATENT DOCUMENTS

| 3,138,970 | 6/1964 | Costa | 74/711 |
| 4,218,938 | 8/1980 | Hattori | 74/710.5 |
| 4,347,760 | 9/1982 | Jewett | 74/710.5 |
| 4,467,886 | 8/1984 | DeClaire | 180/197 |
| 4,523,494 | 6/1985 | Sparks | 74/710.5 |
| 4,671,373 | 6/1987 | Sigl | 74/711 |

FOREIGN PATENT DOCUMENTS

| 11120 | 1/1982 | Japan | 180/249 |
| 544571 | 2/1977 | U.S.S.R. | 180/197 |

Primary Examiner—David M. Mitchell
Assistant Examiner—Everett G. Diedericks, Jr.
Attorney, Agent, or Firm—J. O. Ray, Jr.

[57] ABSTRACT

The present invention teaches an activation apparatus for a differential pawl. Such activation apparatus is designed to prevent damage to components of the differential pawl and/or of the drive train resulting from operator error. According to the invention, when a drive wheel slips, a first apparatus acquires a slip signal; and when a slip signal is present, a second apparatus prevents the pressurization of a pressure-medium-operated actuator apparatus of the activation apparatus.

6 Claims, 2 Drawing Sheets

DIFFERENTIAL PAWL ACTIVATION APPARATUS

FIELD OF THE INVENTION

The present invention relates, in general, to a differential pawl on a motor vehicle by means of which at least two wheels capable of being driven, but which can rotate independently of each other on such vehicle, can be connected such that they will rotate together and, more particularly, the invention relates to an activation apparatus for such differential pawl.

BACKGROUND OF THE INVENTION

An activation apparatus is used in motor vehicle technology in connection with the differential pawl to improve the drive characteristics of such vehicle when at least one driven wheel is slipping.

An application apparatus may be activated, for example, to prevent damage to the various components of the differential pawl, which components are often form-fitted together, and/or to the drive train, only as long as no drive wheels are slipping. For this purpose, in the prior art, it is usually specified that the differential pawl may only be activated by the application apparatus if either the vehicle is standing still, or the gas pedal or the fuel-feed is deactivated or is interrupted until the drive wheels are once again synchronized. In practice, it has been found that compliance with this requirement presents a number of problems, because in difficult driving situations, it places too much of a strain on the driver; and because from the driver's seat, i.e., without looking at the wheels, it is practically impossible to determine when synchronization of the wheels has been satisfactorily reestablished. Therefore, improper operation frequently leads to serious damage to components of the differential pawl and/or of the drive train, particularly to the drive shaft.

An apparatus for the acquisition of a slip signal is taught in German publication DE-AS No. 18 06 671. In this prior art, the slip signal is used as a control variable for the achievement of the synchronization of the driven wheels of a motor vehicle.

SUMMARY OF THE INVENTION

The present invention provides an activation apparatus for a differential pawl; such differential pawl providing a means by which at least two drive wheels of a motor vehicle, which can rotate independently of one another, can be made to rotate in synchronization with an actuator which can be pressurized, at least in the engagement direction of the differential pawl, and an activation mechanism which controls its connection in such engagement direction with a pressure medium source. The activation apparatus includes a first device to monitor the slip of at least one of the drive wheels. The first device emits a slip signal, when at least one of the drive wheels is slipping. A second device is provided by means of which in the presence of a slip signal, the connection of the actuator apparatus in the engagement direction with the pressure medium source can be interrupted.

OBJECTS OF THE INVENTION

It is, therefore, an object of the present invention to provide a simplified differential pawl activation apparatus which insures that in the event of a malfunction of such activation apparatus, the malfunctioning apparatus cannot lead to damage to the various components of the differential pawl and/or the drive train of a motor vehicle.

Another object of the present invention is to provide a differential pawl activation apparatus which is locked for the duration of a slip signal in the engagement direction of the differential pawl, so that the activation apparatus only executes a preselection when activated during this period.

Still another object of the present invention is to provide a differential pawl activation apparatus in which a locking capability in the engagement direction of the differential pawl may be disabled by a device independently of the slip signal until the differential pawl is released, thereby providing a particularly advantageous self-releasing capability of the activation apparatus to keep the differential pawl engaged after engagement thereof until the reactivation of the activation mechanism, even if there is a reappearance of a slip signal.

The above objects and advantages of the present invention, as well as various other objects and advantages of the invention, will become more readily apparent to those persons skilled in the motor vehicle drive train art from the following more detailed description of the invention, when such description is taken in conjunction with the attached drawing figures and the appended claims.

BRIEF DESCRIPTION OF THE INVENTION

In the several views of the drawings, the same reference symbols have been used for items which perform the same function, solid connecting lines for pressure medium connections, and dot-dash lines for electrical connections.

Figure 1:
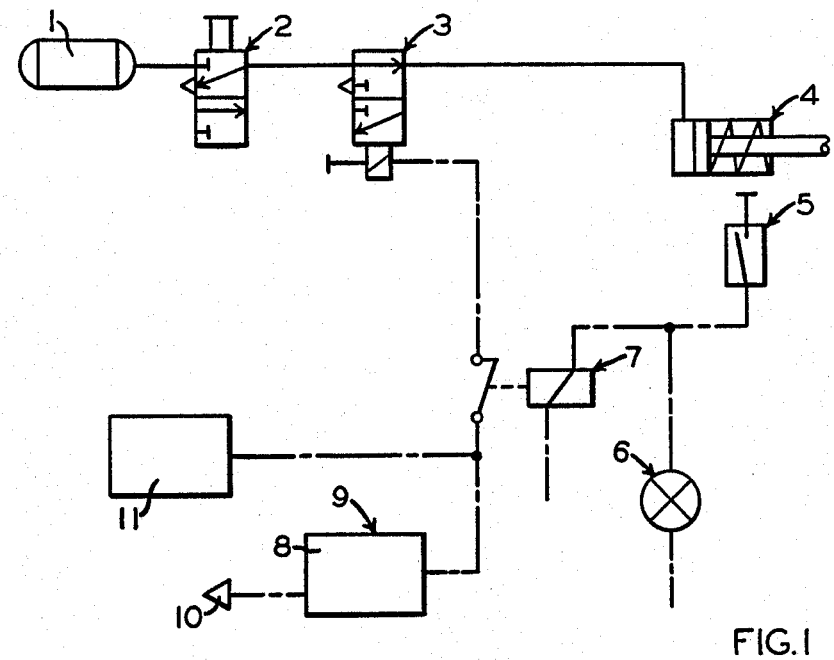
FIG. 1 is a schematic diagram of a first embodiment of an activation apparatus for a differential pawl, which is constructed according to the present invention.

Now referring more particularly to FIG. 1, which is a schematic diagram of a pneumatic activation apparatus for a differential pawl with an actuator apparatus 4 that is designed as a locking cylinder, and a 3/2 multi-way valve 2 which serves as an activation mechanism. The actuator apparatus 4 is moved in the engagement direction of the differential pawl by pressurization with a fluid pressure medium from a pressure medium source 1, and is presently preferred to be prestressed in the release direction of the differential pawl by a spring. The spring provides a means of which the actuator apparatus 4 is pulled back in the release direction upon depressurization. The 3/2 multi-way valve 2, acting as the activation mechanism, is located in the pressure medium connection between the pressure medium source 1 and the actuator apparatus 4. The 3/2 multi-way valve 2 is capable of being set by or driven in either an open position or in a closed position, as desired; in the latter position, it blocks the flow path from its inlet to its outlet, and depressurizes its outlet.

The 3/2 multi-way valve 2 (as shown) is operated manually but it can also be operated otherwise, for example, by a pressure medium or electrically, if desired.

A first apparatus 9 is illustrated, which monitors the slip of at least one drive wheel, and emits a slip signal if the drive wheel being monitored begins to slip. The slip signal is produced by the first apparatus 9 by means of a sensor apparatus 10 and an electronic system 8, whereby the sensor apparatus 10 acquires signals from the drive wheel monitored for slipping, which signals are a function of the wheel-slip. Reference signals from another wheel or drive wheel, or from the vehicle speed, are combined logically in the electronic system 8 with one another; such combining of signals in such electronic system 8 being well understood by persons skilled in the electronics art and, therefore, not explained in greater detail here.

In series with the 3/2 multi-way valve 2 in the above-mentioned pressure medium connection, there is a magnetically-activated 3/2 multi-way valve 3 which represents a second apparatus, by means of which the connection of the actuator 4 in the engagement apparatus of the differential pawl with the compressed air source 1, can be interrupted if a slip signal is received. In the presently preferred embodiment, when the magnet is not activated, the 3/2 multi-way valve 3 will assume an open position; and when the magnet is activated, it will assume a closed position. In the latter position, it cuts off the flow path between the inlet and the outlet, and depressurizes the outlet.

The 3/2 multi-way valve 3 is illustrated in the drawing in the above-mentioned pressure medium connection downstream from the 3/2 multi-way valve 2. In this location, the 3/2 multi-way valve 3 is therefore connected on the inlet side with the outlet of the 3/2 multi-way valve 2, and on the outlet side of the actuator apparatus 4. The 3/2 multi-way valve 3, however, can also be located upstream of the 3/2 multi-way valve 2, without having any real effect on the function of the activation apparatus described below. In this case, the 3/2 multi-way valve 3 would be connected on the inlet side with the pressure medium source 1, and on the outlet side with the inlet of the 3/2 multi-way valve 2, and the outlet side of the latter would be connected with the actuator apparatus 4.

In a manner not illustrated in the drawings in any greater detail, the electronic system 8 of the first apparatus contains a power stage. Connected to the power stage is the exciter circuit of the magnet of the 3/2 multi-way valve 3, and which connects this exciter circuit to a power source (not shown) when a slip signal is received.

In the present embodiment in parallel to the exciter circuit of the magnet of the 3/2 multi-way valve 3, there is a synchronization apparatus (symbolized by 11) connected to the power stage of the electronic system 8 by means of which, when the slip signal is received, measures are taken to achieve synchronization of the wheels and to eliminate the slip which has been identified; for example, an adjustment of the engine. The first apparatus 9 is therefore a component of a drive slip control apparatus, which can be combined in a manner not described in greater detail with other devices, for example, with an anti-locking brake system; such combination being understood by persons skilled in the braking art.

It is apparent that the preceding remarks apply correspondingly to the first apparatus 9, if the first apparatus monitors the slip of several or all of the drive wheels. Such an embodiment is achieved, for example, if the above-mentioned reference signals are acquired from one or more other drive wheels.

In the exciter circuit of the magnet of the 3/2 multi-way valve 3, there is the contact of a switching apparatus 7 which is designed as a relay with a normally closed contact. The winding of this relay is in a circuit which is closed by a measurement sensor 5 when the actuator apparatus 4 is in the engaged position and, therefore, in the position where the differential pawl is engaged. The switching apparatus 7 and the measurement sensor 5, as will be apparent from the following oeprational description, form a third apparatus, which disables the cutoff function of the second apparatus independently of the slip signal when the differential pawl is in an engaged position.

An indicator apparatus 6 is provided, whose power circuit is also closed by the measurement sensor 5 when the differential pawl is in the engaged position, and which thereby indicates the engaged status of the differential pawl.

In normal driving operation, the above-mentioned activation apparatus is in the rest position shown. In this position:

the differential pawl is released; i.e., there is no load on the actuator apparatus 4 in the engagement direction,
the 3/2 multi-valve 2 is in the closed position,
the power circuit of the winding of the switching apparatus 7 is open, and thus its normally closed contact is closed,
there is no slip signal,
the magnet of the 3/2 multi-way valve 3 is not activated, and the valve is therefore in the open position.

If now, however, the first apparatus 9 transmits a slip signal, then the magnet of the 3/2 multi-way valve 3 will be activated. Such activation by the magnet switches the valve into the closed position. This process has no effect on the actuator apparatus 4, or on the differential pawl.

If the driver intends to engage the differential pawl, he can manually switch the 3/2 multi-way valve 2, which is the activation mechanism, from its closed position into its open position. If there is now no slip signal, then on account of the above-mentioned switch executed by the 3/2 multi-way valve 3 in the open position, the actuator apparatus 4 is pressurized in the engagement direction with pressure medium from a reservoir 1, and the differential pawl is engaged. If, however, at the moment of the switching of the 3/2 multi-way valve 2, there is a slip signal, then the above-mentioned switching does not produce a connection between the pressure medium source 1 and the actuator apparatus 4, since such a connection is prevented by the closed 3/2 multi-way valve 3. Only when the slip signal disappears is the above-mentioned connection between the pressure medium source 1 and the actuator apparatus 4 established by the reversal which then takes place, of the 3/2 multi-way valve 3 into its open position. When the slip signal occurs, therefore, by means of the 3/2 multi-way valve 2 acting as the activation mechanism, only a preselection of the differential pawl activation is possible. The above-mentioned activation apparatus thereby protects the differential pawl against engagement when there is a slip signal being transmitted, for example, when at least one of the drive wheels is slipping, and thus protects the various components of the differential pawl and/or of the drive train against unnecessary damage.

When the actuator apparatus 4 has reached its engaged position, then the third apparatus, consisting of the switching apparatus 7 and the measurement sensor 5, protects the differential pawl against unintentional release if the slip signal appears again. The latter case can occur, for example, on a vehicle with several drive axles, each with its own differential pawl and corresponding activation apparatus; but for all the combined slip signal outputs of the combined activation devices, for example, by means of a central electronic processing system, only some of the differential pawls (to be precise, their activation mechanisms) are activated.

In the engaged position of the actuator apparatus 4, the measurement sensor 5 closes the power circuit of the winding of the switching apparatus 7. The normally closed contact of the switching apparatus 7 and thus the exciter circuit of the magnet of the 3/2 multi-way valve 3, opens with the result that as long as the actuator apparatus 4 is in the engaged position, a slip signal cannot switch the 3/2 multi-way valve 3 from its open position.

A release of the differential pawl is possible by a reversal of the 3/2 multi-way valve 2, acting as the activation mechanism, from its open position into its closed position. The pressure is then removed from the actuator apparatus 4 in the engagement direction, and the actuator is moved by the prestressed spring in the release direction, thereby releasing the differential pawl. In the present embodiment, the measurement sensor 5 thereby opens the power circuit of the winding of the switching apparatus 7, whereby the normally closed contact and thus the exciter circuit of the magnet of the 3/2 multi-way valve 3 are closed, with the result that the no-load position described above is once again reached.

The second apparatus described can also consist of a 2/2 multi-way valve (not shown), the outlet of which is not depressurized in the closed position. This configuration has the advantage that the safety function which is achieved in the embodiment with the third apparatus (switching apparatus 7 and measurement sensor 5) is guaranteed, even without it. This configuration thereby offers a particularly economical way to achieve the objectives of the invention.

Figure 2:
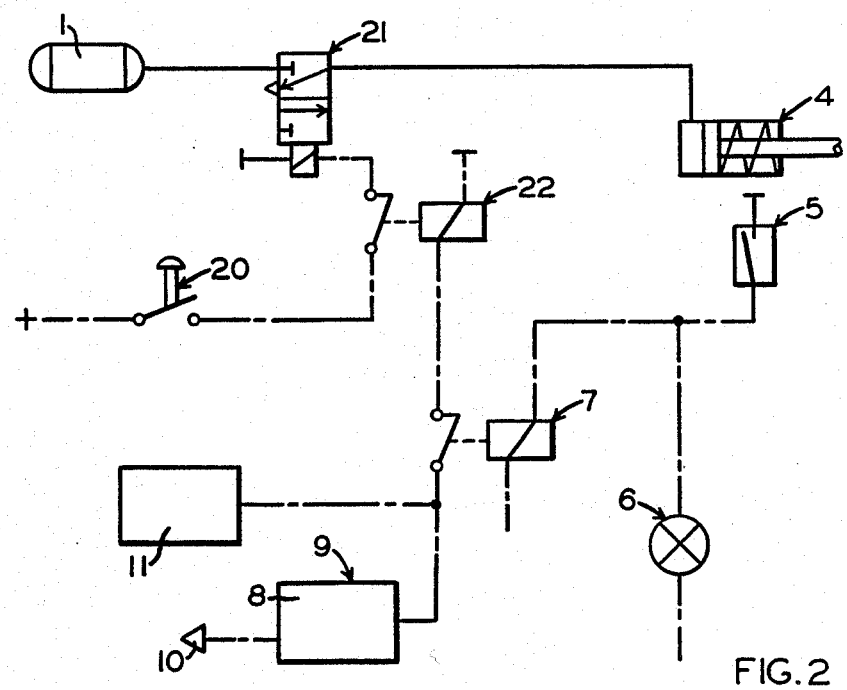
FIG. 2 is a schematic diagram, showing the activation apparatus according to FIG. 1, with a different configuration of activation mechanism.

The alternative embodiment illustrated in FIG. 2 differs from the preceding embodiment in the design of the activation mechanism and of the second apparatus, but is otherwise identical to it.

The activation mechanism in this case can be activated electrically by means of a power circuit, and is designed as a magnetically-activated 3/2 multi-way valve 21, which exhibits the same positions as the activation mechanism of the preceding embodiment, and can be set by activating its magnet into the open position.

In this embodiment, the second apparatus is formed by a switching apparatus 22 designed as a relay valve with a normally closed contact.

In the circuit of the magnet of the 3/2 multi-way valve 21, there is the contact of a switch 20 which can be operated either by hand or by foot, and the normally closed contact of the relay of the switching apparatus 22. The winding of this relay is in a control circuit which is connected to the power stage of the electronic processing system 8. The normally closed contact of the relay forming the switching apparatus 22 is in the control circuit.

In the no-load position of this particular alternative embodiment of the invention:
the differential pawl is released; i.e., the actuator apparatus 4 is depressurized in the engagement direction,
the power circuit of the winding of the switching apparatus 22 is open, and thus its normally closed contact is closed,
there is no slip signal, so that the switching apparatus 22 is not activated and the normally closed contact of its relay is closed,
the switch 20 is not activated, and its contact is therefore open,
the magnet of the 3/2 multi-way valve 21 is not activated, and this valve is therefore in the closed position.

If now the first apparatus transmits a slip signal, then the switching apparatus 22 is activated and interrupts the power circuit of the magnet of the 3/2 multi-way valve 21, without this process having any effect on the actuator apparatus 4, and thus the differential pawl.

If the driver wishes to engage the differential pawl for some reason, he can activate the switch 20 and thereby close its contact. If there is no slip signal and, consequently, the normally closed contact of the relay of the switching apparatus 20 is closed, then the activation of the switch 20 by the driver activates the magnet of the 3/2 multi-way valve 21, and thereby moves it into its open position. This action will result in the connection between the pressure medium source 1 and the actuator apparatus 4 being opened in the engagement direction. If, however, at the moment of the activation of the switch 20, there is a slip signal, the normally closed contact of the relay forming the switching apparatus 22 is opened, so that the activation of the switch 20 cannot cause an activation of the magnet of the 3/2 multi-way valve 21. It is preferred that only when the slip signal disappears is the power circuit of the magnet of the 3/2 multi-way valve 21 closed on account of the reversal of the above-mentioned normally closed contact, the magnet is activated, and the pressure medium connection is thereby established between the pressure medium source 1 and the actuator apparatus 4 in the engagement direction. In this alternative embodiment too, therefore, by means of the 3/2 multi-way valve 21 acting as the electrically-activated activation mechanism when a slip signal is present, only a preselection of the differential pawl activation is possible.

The switching apparatus 22, acting as the second apparatus on account of its indicated function, represents an electrically-controlled switching apparatus which can be activated at least when there is a slip signal (namely, when the switching apparatus 22 is not activated and the manual switch 20 is activated); and in the activated state, interrupts the power circuit of the activation mechanism.

To release the differential pawl, the switch 20 is activated in the reverse direction, its contact is thereby opened, and the result is that the magnet of the 3/2 multi-way valve 21 is deactivated and the valve is switched from its open position into its closed position, and the actuator apparatus 4 is thereby depressurized in the engagement direction. With the return of the actuator apparatus 4 to its no-load position, the entire activation apparatus is once again in the no-load position.

Otherwise, the comments made with regard to the embodiment illustrated in FIG. 1 apply accordingly whereby, instead of the exciter circuit of the magnet of the 3/2 multi-way valve 3 (which is present there) there is a control circuit of the switch apparatus 22.

Figure 3:
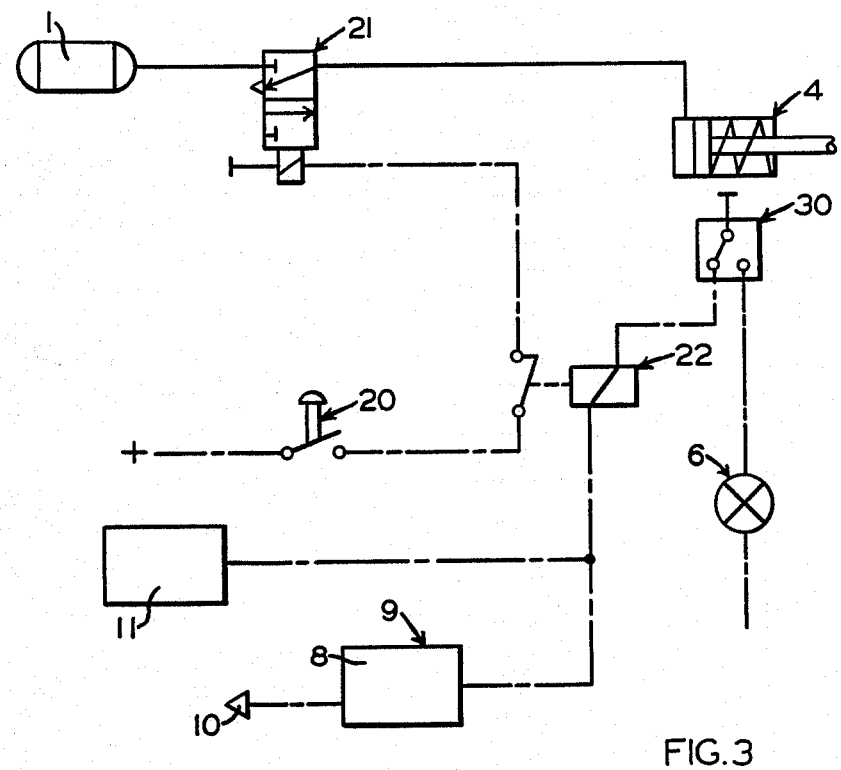
FIG. 3 is a schematic diagram showing details of another configuration of the activation apparatus shown in FIG. 2.

There is illustrated in FIG. 3 a configuration of another alternative embodiment previously illustrated in FIG. 2, in which the third apparatus 5, 7 represented there is replaced by a simplified design.

As shown in FIG. 3, the third apparatus includes a position sensor 30, which prevents the activation of the switching apparatus 22 when the actuator apparatus 4 is in the engaged position. For this type of operation, the position sensor 30 must monitor the engaged position of the adjustment apparatus 4.

As is also illustrated in FIG. 3 by the contact located in the control circuit of the switching apparatus 22, the position sensor 30 closes this control circuit, as long as the actuator apparatus 4 is not in the engaged position. Further, the position sensor 30 causes this control circuit to open when the control apparatus 4 reaches the engaged position. The position sensor 30 thereby prevents the switching apparatus 22, serving as the second apparatus, from being activated when a slip signal occurs while the differential pawl is engaged, and thereby leading to the release of the differential pawl.

On account of the operation described above, the position sensor 30 assumes the desirable function of the third apparatus; namely, of disabling the cutoff function of the second apparatus independently of the slip signal when the differential pawl is in an engaged position.

As shown, the position sensor 30 can be equipped with a changeover contact, which closes the power circuit of the indicator lamp 6 when the differential pawl is engaged.

Otherwise, the comments made regarding the embodiment illustrated in FIG. 1 apply correspondingly to the alternative embodiments illustrated in FIGS. 2 and 3.

It should be apparent to those persons skilled in the art that the preceding remarks do not exhaustively describe the field of application of the present invention. For example, in a manner not shown but which is easily understood by persons skilled in the art, the functions of the switch 20 and/or of the second apparatus and/or of the third apparatus can be performed with separate electronic logic or switching elements, or ones which are partly or completely combined, electrically and/or structurally, with the drive slip control apparatus and/or other electrical/electronic components on the vehicle.

It should also be understood that the activation apparatus can also be activated, instead of pneumatically, by other gaseous or liquid pressure mediums.

The actuator apparatus can also be designed to be double-acting; i.e., it can be moved by pressure medium both in the engagement direction and in the release direction. In this case, the third apparatus formed by the switching apparatus 7 and the measurement sensor 5 can be eliminated; and in a manner which will be obvious to a specialist in the field, the activation mechanism must also be designed to control the pressure medium connection between the actuator apparatus in the release apparatus and the pressure medium source, or its own pressure medium source, for example, as a 5/2 multi-way valve, or it can exhibit separate mechanisms on both pressure medium connections, which must then be appropriately connected.

As can be seen from the above description of a number of alternative embodiments, the slip signal is formed by the first apparatus, if at least one of the drive wheels is slipping in relation to the surface of the road and/or if the drive wheels are turning with different speeds. The first apparatus can therefore be designed so that it only forms the slip signal when the above-mentioned slip or the above-mentioned speed difference exceed a predetermined value. A combination of the configurations described above is also possible.

As reference data for the recognition of the above-mentioned slip in relation to the surface of the road, a control wheel speed corresponding to the speed of the vehicle or the speed of at least one of the non-driven wheels, can be used.

The invention can therefore be executed with any type of activation mechanism of the prior art which is suitable for controlling a pressure medium connection, whereby the activation mechanism can also be activated in any manner according to the prior art, for example, manually, by means of a pressure medium or by means of an electrical circuit, for example, by means of a solenoid magnet and a manual switch.

In one configuration, the second apparatus is located on the pressure-medium-side in series with the activation mechanism, and is designed as a magnetically-operated multi-way valve in the connection between the pressure medium source and the actuator apparatus in the engagement direction, and the magnet of which can be activated when the slip signal occurs. This multi-way valve is open in the normal position; and when the magnet is activated, it assumes a closed position in which it is impermeable.

The multi-way valve can also be designed so that its output acts as a pressure relief valve in the closed position.

If the activation mechanism is equipped with an electrical activation, the second apparatus can be designed as an electrically-controlled switching apparatus which can be activated at least when there is a slip signal, and which interrupts the power circuit of the activation mechanism when it is activated. Such a switching apparatus can be made of commercially available components; for example, a relay with a normally closed contact.

The third apparatus, for example, can act as an additional control apparatus activated by the pressure medium on the second apparatus. In one economical configuration, the third apparatus is electrical, so that it controls the exciter circuit of the above-mentioned multi-way valve or the control circuit of the above-mentioned switching apparatus by means of a switching apparatus, and it interrupts the circuit in question when the differential pawl is in an engaged position.

In one advantageous and economical configuration, the third apparatus can exhibit a measurement sensor to control the above-mentioned switching apparatus, which monitors the engagement position of the actuator and controls the switching apparatus.

In another advantageous configuration, the switching apparatus serving as the third apparatus can be designed as a relay with a normally closed contact, whose power circuit is closed by the measurement sensor if the actuator reaches its engaged position.

In the case mentioned above, where the activation mechanism can be activated electrically and the second apparatus is designed as a switching apparatus, e.g., as a relay with a normally closed contact, the function of the third apparatus can be performed economically as a position sensor which monitors the engaged position of the actuator, and which disables the switching apparatus serving as the second apparatus when the actuator apparatus is in the engaged position.

The actuator apparatus can be double-acting, i.e., it can be designed to operate either in the release direction of the differential pawl, activated by pressure medium, or it can be a single-acting mechanism, i.e., automatically-releasing, for example, with a prestressed spring. In the case of a double-acting apparatus, the activation mechanism can be advantageously designed so that it also controls the connection of the actuator apparatus in the release direction with the pressure medium source. Separate activation mechanisms for engagement and release are also possible, but steps must be taken to prevent inadvertent simultaneous activation.

The invention can be used to advantage in a vehicle which is equipped with a drive slip control apparatus; such an apparatus can act on the engine, for example, specifically its speed control apparatus. This case is particularly advantageous to the extent that the slip signal required by the invention is already available without added expense, and a combination installation is created which combines protection of the differential pawl and the achievement of synchronization of the wheels or the elimination of slip in relation to the surface of the road.

The above-mentioned electrical activation mechanism and/or the second apparatus and/or the third apparatus can consist of separate or partly or completely integrated electronic logic and switching elements, which can be electrically and/or structurally combined, in whole or in part, with the drive slip control apparatus and/or other electric/electronic components on the vehicle.

While a number of presently preferred embodiments of the present invention have been shown and discussed in detail above, it should be obvious to those persons skilled in the motor vehicle drive train art that other modifications and adaptations can be made to this invention without departing from the spirit and scope of the attached claims directed to such invention.

We claim:

1. An activation apparatus for a differential pawl, said differential pawl capable of rotating at least two drive wheels in a motor vehicle which can rotate independently of one another in synchronization, said activation apparatus having an actuator which can be pressurized at least in an engagement direction of said differential pawl and an activation mechanism which controls its connection in such engagement direction with a fluid pressure source, said activation apparatus comprising:
   (a) a monitoring means positioned on such motor vehicle for monitoring slip of at least one drive wheel, and for emitting a wheel-slip signal when said at least one drive wheel slips;
   (b) a magnetically-activated multi-way valve arranged in a connection between said fluid pressure source and said actuator in series with said activation mechanism which interrupts said connection when its activation magnet is excited; and
   (c) said activation magnet of said multi-way vavle being connected for excitation by said wheel-slip signal; and
   (d) a disabling means for disabling said activation magnet from being excited independently of said wheel-slip signal when said differential pawl is in an engaged position, and said disabling means includes a switching device which interrupts an exciter circuit of said activation magnet of said multi-way valve when said differential pawl is engaged, and said disabling means includes a measurement sensor to control said switching device by activating said switching device when said differential pawl reaches said engaged position.

2. An activation apparatus, according to claim 1, wherein said switching means includes a relay having a normally closed contact.

3. An activation apparatus, according to claim 1, wherein said switching device is a relay having a normally closed contact, and includes a power circuit which is closed by said measurement sensor when said actuator apparatus reaches said engaged position.

4. An activation apparatus, according to claim 1, wherein said disabling means is a position sensor which monitors an engaged position of said actuator and disables said activation magnet when said actuator is in an engaged position.

5. An activation apparatus, according to claim 1, wherein said monitoring means is included as part of a drive slip control apparatus.

6. An activation apparatus, according to claim 1, wherein said disabling means is accomplished by one of separate and partially and completely integrated electronic logic and switching elements, which are combined in one of partially and completely as one of electrically and structurally with one of a drive slip control apparatus and other electronic components of such motor vehicle.

* * * * *